July 12, 1927.

W. E. TRUMPLER ET AL 1,635,565

FLEXIBLE COUPLING

Filed May 28, 1924

WITNESSES:
R. S. Harrison
M. B. Jaspert

INVENTORS
William E. Trumpler and
Carl Richard Soderberg
BY
Wesley G. Carr
ATTORNEY July 12, 1927.
W. E. TRUMPLER ET AL
1,635,565
FLEXIBLE COUPLING
Filed May 28, 1924
2 Sheets-Sheet 2
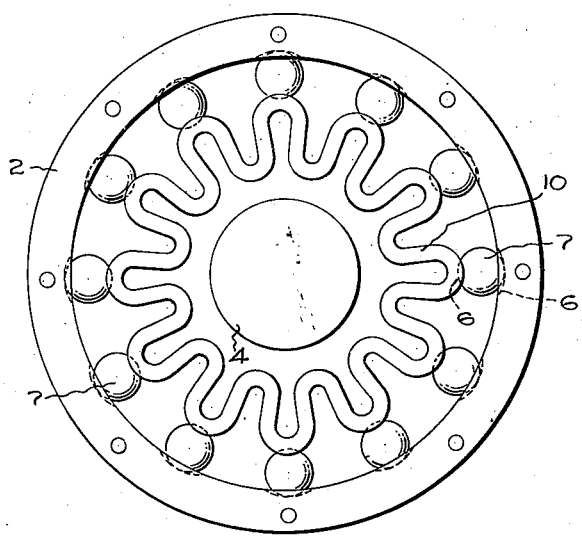
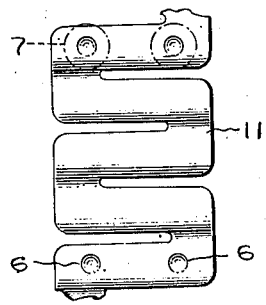
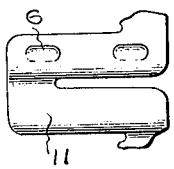
WITNESSES:
INVENTORS
William E. Trumpler and
Carl Richard Soderberg
BY
ATTORNEY Patented July 12, 1927.

1,635,565

UNITED STATES PATENT OFFICE.

WILLIAM E. TRUMPLER, OF WILKINSBURG, AND CARL RICHARD SODERBERG, OF EDGEWOOD, PENNSYLVANIA, ASSIGNORS TO WESTINGHOUSE ELECTRIC & MANUFACTURING COMPANY, A CORPORATION OF PENNSYLVANIA.

FLEXIBLE COUPLING.

Application filed May 28, 1924. Serial No. 716,327.

Our invention relates to couplings for joining a pair of rotating shaft members, more particularly to a flexible coupling which permits misalignment of the complementary coupling members without producing detrimental strains on the parts so coupled.

It is among the objects of our invention to provide a flexible coupling which shall be adapted to couple a pair of rotating shafts to provide an unrestricted running motion with a minimum amount of wear on the shaft journals or bending flexure on the shaft members.

It is a further object of our invention to provide a flexible coupling which shall provide a certain amount of flexibility for tangential, axial and radial forces exerted thereon and which shall be so designed as to provide an amount of such flexibility in accordance with the particular service requirements for which it is to be utilized.

It is a further object of our invention to provide a flexible coupling of the above-designated character which shall be of simple, compact and durable mechanical construction comprising a minimum number of parts, which shall be inexpensive to construct, and adapted to manufacture in production quantities.

It has previously been proposed to utilize rings for coupling members because of their simple and rigid construction and because of their flexibility. Such flexible ring structures have been proposed for flexible gear elements which require only tangential deflection, but for a coupling member, radial and axial deflection must be provided as well.

We propose to utilize a flexible ring element in conjunction with ball members which are located in spherical seats provided in the rings to obtain tangential, axial and radial flexure, the proportions of the rings, spherical or ellipsoidal seats, and balls being such as to permit variation of the degree of flexibility required for any given direction.

In the accompanying drawing constituting a part hereof,

Fig. 3 is a view, partially in cross-section and partially in elevation, of a coupling showing a modified form of spring element, Fig. 4 is a schematic view of still another modification of the spring element, and Fig. 5 is a similar view showing a different seating portion for the ball members.

Figure 1:
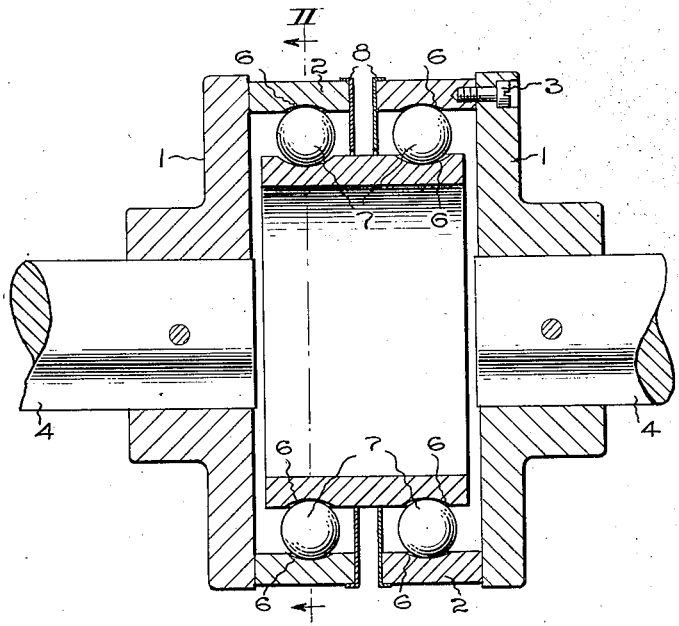
Figure 1 is a longitudinal sectional view of a coupling member embodying the principles of our invention.

Referring to Fig. 1, a coupling therein illustrated comprises a pair of complementary flanged hubs 1 having rings 2 secured thereto as by a plurality of screws 3. The hubs 1 are adapted to receive cylindrical shafts 4 of dynamo-electric machines or other rotating elements which are co-operatively engaged for operation. A center ring 5 having a relatively wide face is disposed within the rings 2 and the rings 2 and 5 are provided with spherical or ellipsoidal grooves or seating portions 6 which are angularly spaced in radial alignment so that they form complementary recesses for balls 7 which are disposed therein.

The balls are inserted by deflecting the rings sufficiently to force the balls into the spherical seats or the outer rings 2 may be heated to expand them sufficiently for that purpose.

The complementary seating or cup-shaped portions are preferably of ellipsoidal shape, that is, having less curvature in an axial direction than radially as is illustrated in the figures of the drawing. The ellipsoidal shape will provide greater axial than tangential flexibility, which is highly desirable in flexible couplings.

The operation of this device is briefly as follows: When a torque is applied to the coupling, the balls will run up on the sides of the spherical seats and produce a deflection of the rings. For axial motion, the balls roll in a radial plane through the axis of the shaft and radial misalignment will produce tilting of the ring 5.

By providing cups with larger or smaller radii, any ratio of radial and tangential deflection may be obtained. The rings and number of balls may also be so proportioned that the deflection of the rings will be such that one or more points between the ball seats will sustain no radial deflections so that the screw bolts 3 which secure the hubs and rings 1 and 2, respectively, will transmit tangential load only without being subjected to radial shearing stresses.

The spring characteristic for any deflection is a rising one, that is, there will be a relatively large deflection for low torque and less deflection for high torque transmission. The stresses in the materials do not increase as fast as the torsional load and therefore a substantial overload may be carried without danger.

Guard members 8 are secured to the rings 2 to constitute grease chambers for carrying lubricant which is essential to obtain a minimum rolling friction and frictional wear as well as to protect the wearing elements against foreign substances such as grit and dirt.

Figure 2:
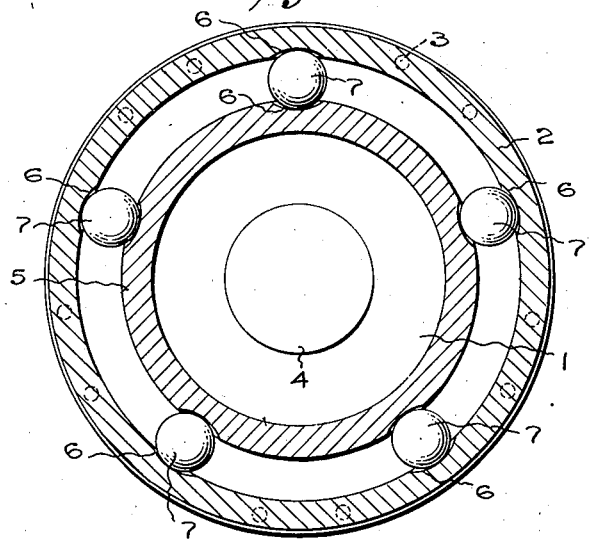
Fig. 2 is a transverse section thereof taken along the lines II—II of Fig. 1.

In the modification shown in Figs. 3 and 4, the central ring or spring member 5, Figs. 1 and 2, is replaced by a radially corrugated spring element 10, Fig. 3 and an axially corrugated element 11, Fig. 4.

The radially corrugated member 10 is provided with seats 6 for the balls 7 which are seated in apertures 6 of the outer rings 2. The waved type of flexible member provides greater flexibility with a resulting decrease in the radial load on the balls 7. We have found that the flexibility of the member 10 is from three to five times that of the circular ring 5, Fig. 1.

In the plane or cylindrical type of corrugated ring 11, the deflection is materially increased over that of the ring 5 in about the same proportion as in the member 10. The ball seats 6 may be ellipsoidal or elongated as shown in Fig. 5.

The assembly of the balls and rings and the operation of the couplings shown in Figs. 3 and 4, are similar to those of the coupling shown in Fig. 1.

It is evident from the foregoing description of our invention that coupling members made in accordance therewith provide a simple, compact structure which is relatively small for the amount of torque transmitted as compared to the bulky construction of prior devices and that such a coupling is efficient in its operation and not easily destroyed since the several co-operating parts are of durable and mechanically strong design.

Although we have described a specific embodiment of our invention, it will be obvious to those skilled in the art that various changes may be made in the design and proportion of the several co-operating parts without departing from the principles herein set forth.

We claim as our invention:

1. A flexible coupling comprising a pair of complementary hub members having rings axially disposed and secured thereto, a ring member disposed between said hub rings, and balls contained within apertures provided in said rings.

2. A flexible coupling comprising a pair of complementary hub members having rings axially disposed and secured thereto, a ring member having a relatively wide face disposed between said hub rings, and balls contained within apertures provided in said rings.

3. A flexible coupling comprising a pair of axially disposed complementary ring members, a ring having a relatively wide face disposed within said rings and balls disposed in apertures provided in said rings to co-operatively engage the same.

4. A flexible coupling comprising a pair of axially disposed complementary ring members, a ring having a relatively wide face disposed within said rings, all of said rings having apertures provided therein and balls disposed within said apertures to co-operatively engage the said ring members.

5. A flexible coupling comprising a pair of axially disposed complementary ring members, a ring having a relatively wide face disposed within said rings, all of said rings having spherical seats provided therein and balls disposed within said seats to co-operatively engage the said ring members.

6. A flexible coupling comprising a pair of axially disposed complementary ring members, a ring having a relatively wide face disposed within said rings, all of said rings having seats of suitable curvature provided therein and balls disposed within said seats to co-operatively engage the said ring members.

7. A flexible coupling comprising a pair of complementary ring members having spherical seating portions in the inner periphery thereof, a co-operating ring having a relatively wide face and a double row of spherical seats for registering with the seats of said complementary rings and balls disposed in said seats to co-operatively engage all of said rings.

8. A flexible coupling comprising a pair of complementary ring members having spherical seating portions in the inner periphery thereof, a co-operating ring having a relatively wide face and a double row of spherical seats for registering with the seats of said complementary rings and guards to protect said balls and seats from foreign matter.

9. A flexible coupling comprising a plurality of complementary ring members, a flexible element disposed therein and balls co-operatively engaging said ring members and said flexible element.

10. A flexible coupling comprising a plurality of complementary ring members, a flexible element disposed therein and extending axially in alinement with said rings and balls interposed between said rings and the flexible element.

11. A flexible coupling comprising a plurality of complementary ring members, a flexible element disposed therein, and balls co-operatively engaging said ring and flexible members, said balls being arranged in transverse planes.

12. A flexible coupling comprising a plurality of complementary ring members, a flexible element disposed therein and balls co-operatively engaging said ring and flexible members, said balls being arranged in transverse planes in alinement with said complementary rings.

13. A flexible coupling comprising a plurality of complementary ring members, a flexible element disposed therein and balls co-operatively engaging said ring and flexible members, said balls being arranged in two transverse planes in alinement with said complementary rings.

In testimony whereof, we have hereunto subscribed our names this 21st day of May, 1924.

WILLIAM E. TRUMPLER.
CARL RICHARD SODERBERG.